(12) United States Patent
Kasai et al.

(10) Patent No.: US 6,635,823 B2
(45) Date of Patent: Oct. 21, 2003

(54) COVER FOR PREVENTING WATER FROM ENTERING A JUNCTION BLOCK

(75) Inventors: Koji Kasai, Yokkaichi (JP); Shuji Hamada, Kariya (JP); Ikutoshi Tsuchiya, Kariya (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/205,149

(22) Filed: Jul. 24, 2002

(65) Prior Publication Data

US 2003/0019651 A1 Jan. 30, 2003

(30) Foreign Application Priority Data

Jul. 26, 2001 (JP) ........................................ 2001-226082

(51) Int. Cl.[7] ................................................ H02G 3/14
(52) U.S. Cl. ............................ 174/66; 174/50; 174/59; 220/3.8; 220/3.2; 439/76.2
(58) Field of Search ............................. 174/66, 67, 50, 174/52.1, 59, 65 R, 17 R; 220/3.3, 3.4, 3.8, 4.02, 241, 242; 439/76.2, 949, 139, 165, 76.1

(56) References Cited

U.S. PATENT DOCUMENTS

| | | | | |
|---|---|---|---|---|
| 5,574,254 A | * | 11/1996 | Mori et al. ................ | 174/52.3 |
| 5,674,090 A | * | 10/1997 | Sumida et al. ............ | 439/540.1 |
| 5,755,579 A | * | 5/1998 | Yanase et al. ............. | 439/76.2 |
| 5,864,091 A | * | 1/1999 | Sumida ....................... | 174/50 |
| 5,995,380 A | * | 11/1999 | Maue et al. ............... | 439/76.2 |
| 6,045,412 A | * | 4/2000 | Guanco et al. ............ | 439/752 |
| 6,077,102 A | * | 6/2000 | Borzi et al. ................ | 439/76.2 |
| 6,108,202 A | * | 8/2000 | Sumida ....................... | 361/690 |
| 6,121,548 A | * | 9/2000 | Matsuoka ................... | 174/59 |
| 6,462,270 B1 | * | 10/2002 | Depp et al. ................. | 174/50 |
| 6,545,217 B2 | * | 4/2003 | Sato ............................ | 174/50 |

* cited by examiner

Primary Examiner—Dean A. Reichard
Assistant Examiner—Angel R. Estrada
(74) Attorney, Agent, or Firm—Anthony J. Casella; Gerald E. Hespos

(57) ABSTRACT

A cover (1) for preventing water from entering a junction block (10) is rotatably held on a bracket (15) used to mount the junction block on a vehicle body. A connector (38) is fitted into a connector holder (20) in an upper surface (10a) of the junction block (10). However, a connector (39) cannot be fitted into a connector holder (23) provided in a side surface (10b) unless the cover (1) is rotated counterclockwise. This enables the upper surface (10a) of the junction block (10) to be covered for a water-entrance preventing purpose, and can prevent such an operation from being forgotten.

14 Claims, 6 Drawing Sheets

COVER FOR PREVENTING WATER FROM ENTERING A JUNCTION BLOCK

BACKGROUND OF THE INVENTION

1. Field of the Invention

The invention relates to a cover for the upper surface of a junction block of an automotive vehicle to prevent water from entering the junction block.

2. Description of the Related Art

Junction blocks are used in automotive vehicles to connect a plurality of electrical systems. Conventional junction blocks have merely had connection terminals in a box. However, junction blocks that have electrical functions are used widely at present. Water drops can enter a junction block in an engine compartment and can short the circuits therein. As a result, devices have been considered for preventing water from entering the junction block.

A junction block that attempts to prevent the entrance of water is identified by the numeral 100 in FIG. 7. The junction block 100 has an upper surface 100a and a waterproof sheet 105 is adhered to the upper surface 100a. A wiring harness 110 has a connector 111 at one end that is fitted into a connector holder 101 in the junction block 100 for connection. The waterproof sheet 105 then is adhered to the upper surface 100a of the junction block 100 to cover the upper surface 100a of the junction block 100, the connector holder 101 and the connector 111 to prevent water from entering the junction block.

Another junction block is identified by the numeral 100 in FIG. 8 and is formed with a connection holder 101. The junction block 100 is used with a wiring harness 120 that has a connector 121 held at one end by a vinyl tape 125. The connector 121 is fitted into the connector holder 101 in the junction box 100 for connection. A waterproof sheet 115 is adhered to the wiring harness 120 and covers upper parts of the connector 121, the connector holder 101 and the junction block 100 when the connector 121 is fitted in the connector holder 101 in the junction block 100. Thus, the waterproof sheet 115 prevents the entrance of water into the connector holder 101.

Water will enter the junction block 100 of FIG. 7 if the assembler does not adhere the waterproof sheet 105 to the upper part of the junction block 100 after the connector 111 is fitted into the connector holder 101. Further, the wiring harness 120 and the waterproof sheet 115 are formed integrally in the prior art as shown in FIG. 8. Thus, the waterproof sheet 115 hinders the connection of the connector 121. There is also a problem of striping off the waterproof sheet 115 during the connecting operation.

The present invention was developed in view of the above problems and an object thereof is to facilitate connection of connectors with a junction block and to ensure that the covering of the upper surface of the junction block for a water-entrance preventing purpose is not forgotten.

SUMMARY OF THE INVENTION

The invention is directed to a cover for preventing water from entering a junction block, such as a junction block in an automotive vehicle body. The junction block enables the connection of a plurality of electrical systems and has connector holders in its upper and side surfaces. The cover is mounted rotatably or pivotally on the junction block, and preferably is held on a bracket that mounts the junction block on the vehicle body. A second connector cannot be fit into the connector holder in the side surface of the junction block for connection unless the cover is rotated after a first connector is into the connector holder in the upper surface of the junction block for connection. Thus, the connectors cannot be connected without covering the upper surface of the junction block by the cover.

The connection of the connections and the rotation of the cover need to be performed in a proper order. Thus, the connectors can be connected without forgetting an operation of covering the upper surface of the junction block by the cover cannot be forgotten.

The bracket comprises a locking mechanism for stopping the rotation of the cover. Accordingly, the cover is not free to rotate during the connector connecting operation, and the connector connecting operation can be performed easily, thereby improving operation efficiency.

The cover preferably is rotatable between two mounting portions that project from the junction block.

The cover preferably comprises a lid for substantially covering the upper portion of the junction block and two walls projecting angularly from the lid. At least one wall and/or a portion of the lid preferably covers at least part of the connector holder in the side surface before the cover is rotated after connection of the first connector.

The invention also relates to a method of mounting a junction block having a cover for preventing water from entering the junction block. The junction block can be provided in an automotive vehicle body for connecting a plurality of electrical systems and has connector holders in its upper and side surfaces. The method comprises rotatably or pivotally mounting the cover on the junction block, at least partly fitting a first connector into the connector holder in the upper surface of the junction block for connection; rotating the cover so as to at least partly fit a second connector into the connector holder in the side surface of the junction block for connection.

The step of mounting the cover may comprise mounting the cover on a bracket used to mount the junction block on the vehicle body.

The rotation of the cover preferably comprises stopping the rotation by a locking mechanism at the bracket.

The mounting of the cover may comprise mounting the cover rotatably or pivotally between two mounting portions projecting from the junction block.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
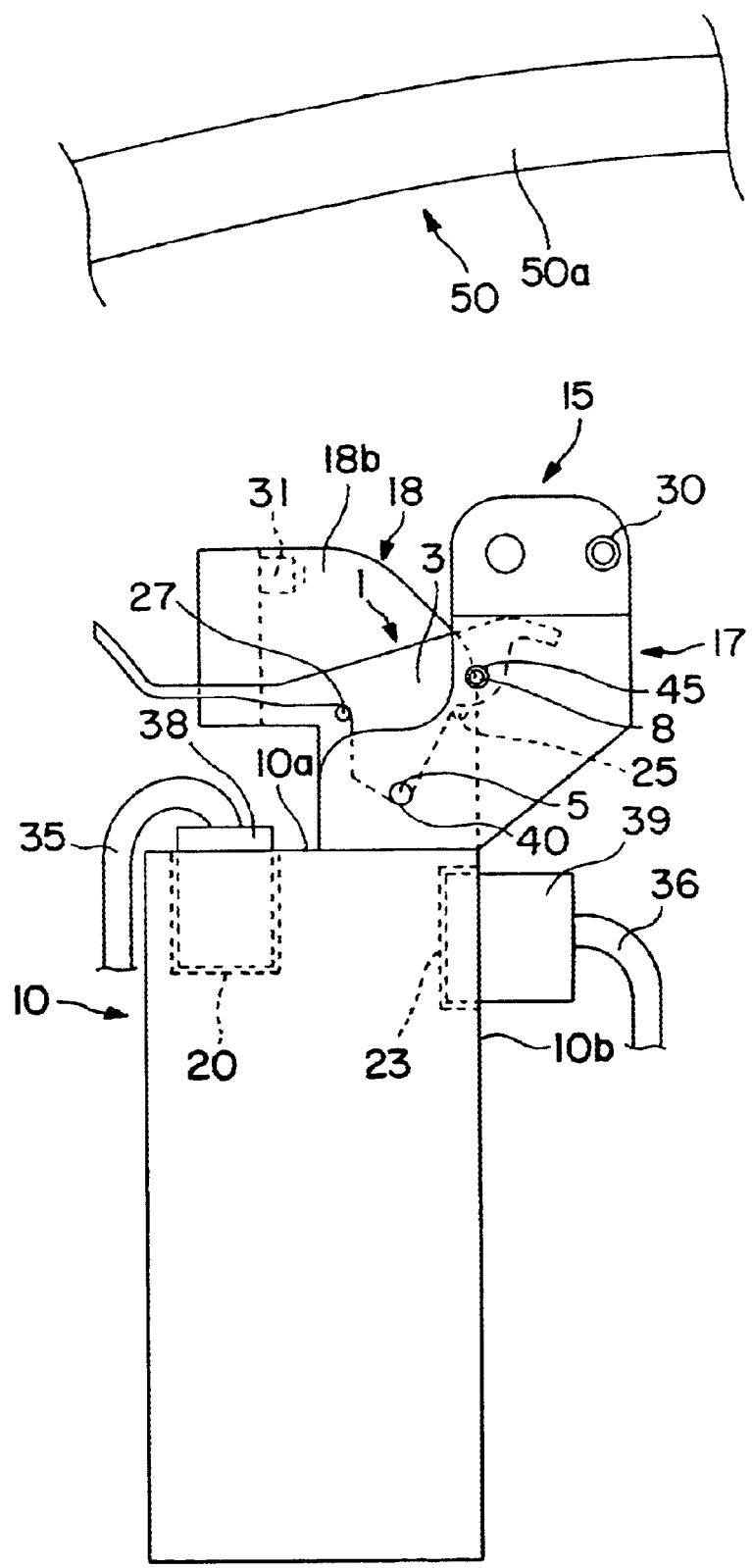
FIG. 1 is a side view showing a state where a cover 1 rotatably held on a bracket 15 covers an upper surface 10a of a junction block 10.
Figure 2:
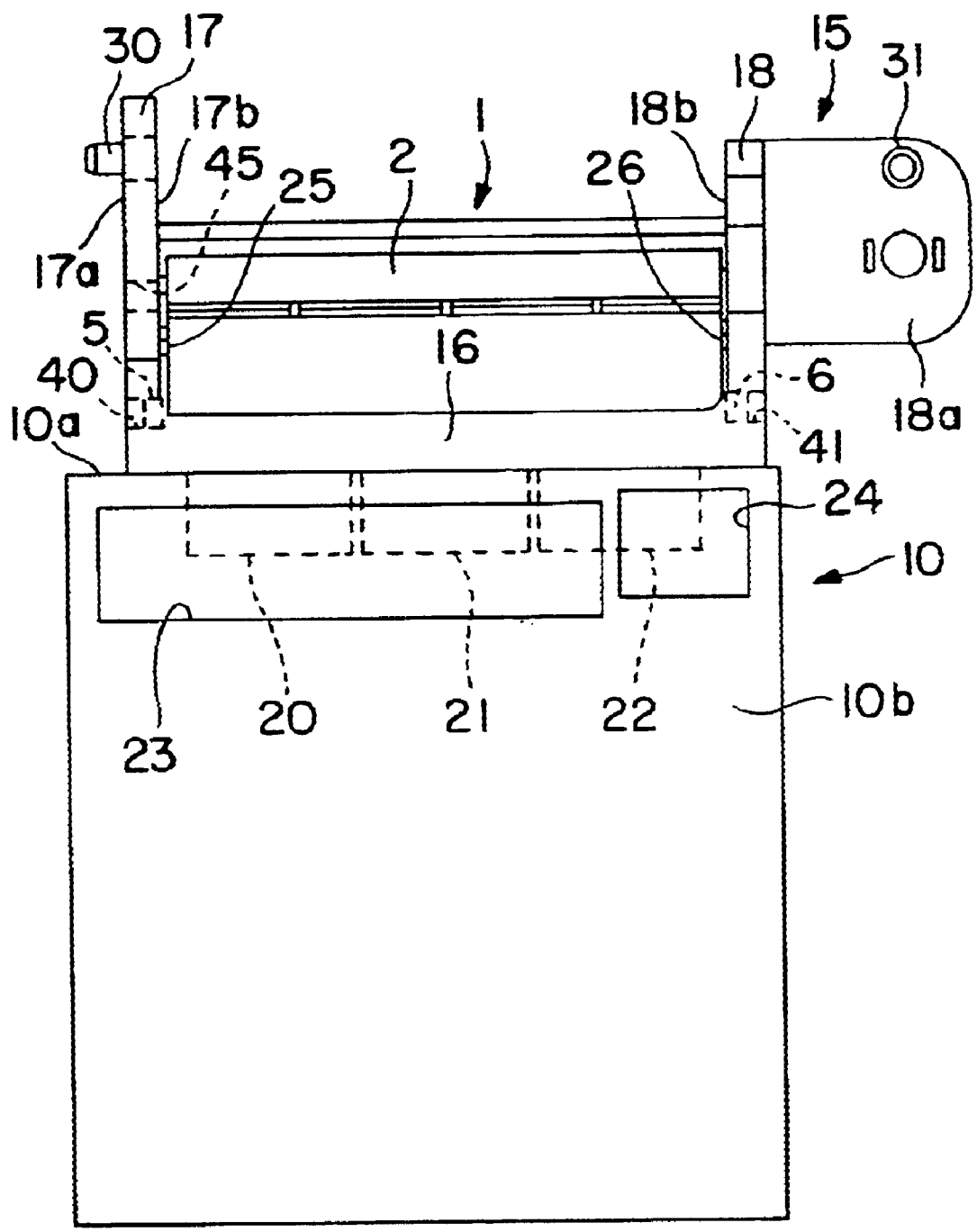
FIG. 2 is a front view showing the state of FIG. 1.
Figure 3:
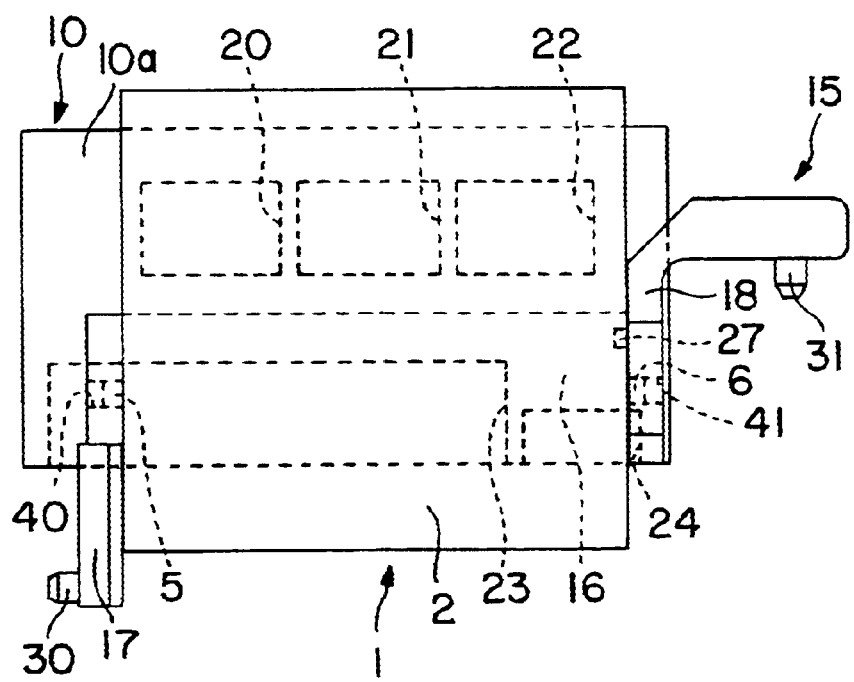
FIG. 3 is a plan view showing the state of FIG. 1.

A junction block in accordance with the invention is identified generally by the numeral 10 in FIGS. 1 to 3 and may be one of several such junction blocks used, for example, under a front hood of an automotive vehicle.

The junction block 10 is a substantially rectangular parallelepiped made e.g. of a synthetic resin and formed with an upper surface 10a and a side surface 10b. First through third upper connector holders 20, 21 and 22 open up in the upper surface 10a of the junction block 10 and are configured to hold connectors, such as the connector 38. First and second side connector holders 23 and 24 open laterally in the side surface 10b of the junction block 10 and are configured to hold connectors, such as the connector 39. The junction block 10 may be provided with still other connector holders, as well as unillustrated circuit board, relays, etc., and is secured to the vehicle body by a bracket 15.

A duct 50 for an air conditioner may extend above the junction block 10, and water drops formed e.g. by dew condensation on an outer surface 50a of the duct 50 may fall down on the junction block 10. The fallen water drops could enter the connector holder 20 in the upper surface 10a of the junction block 10.

As shown in FIGS. 1 to 3, the bracket 15 that secures the junction block 10 to the vehicle body (not shown) is molded e.g. of a synthetic resin and is integral or unitary with the junction block 10. The bracket 15 is substantially U-shaped and includes a junction block holder 16 that is substantially rectangular in plan view. Left and right mounting plates 17, 18 project substantially normally from the shorter edges of the junction block holder 16 and are substantially L-shaped when viewed sideways.

A projection 30 projects from an outer surface 17a of the mounting plate 17 and is engageable with an engaging portion (not shown) of the vehicle body. Similarly, a projection 31 projects from an outer surface 18a of the mounting plate 18 and is engageable with an engaging portion (not shown) of the vehicle body. The mounting plate 17 is formed with a through hole 40, and the mounting plate 18 similarly is formed with a through hole 41. The through holes 40, 41 are located at the same position when viewed sideways. A projection 25 is provided on an inner surface 17b of the mounting plate 17 of the bracket 15 and projections 26 and 27 are provided on an inner surface 18b of the mounting plate 18 of the bracket 15. The mounting plate 17 is formed with a through hole 45 separate from the through hole 40.

Figure 4:
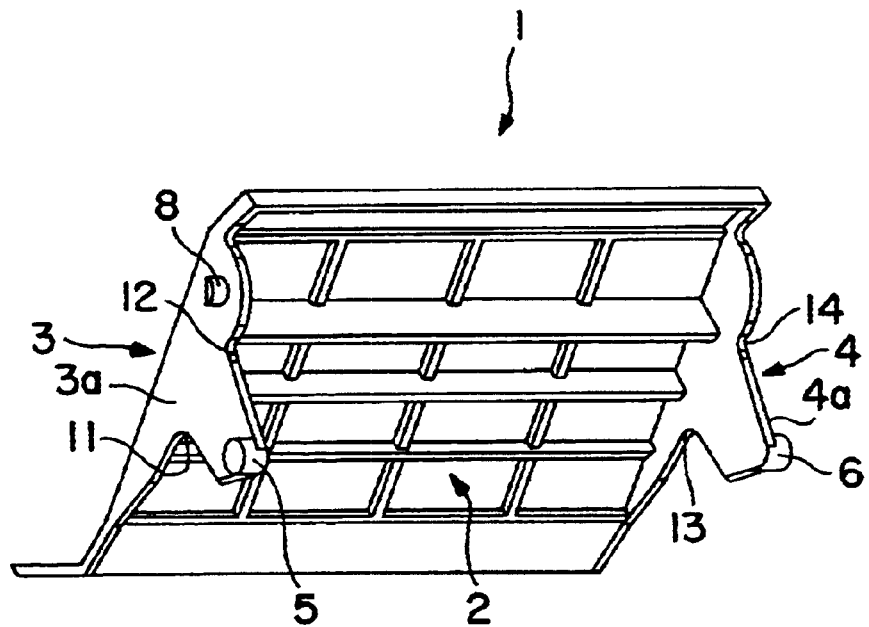
FIG. 4 is a perspective view showing the cover 1.
Figure 5:
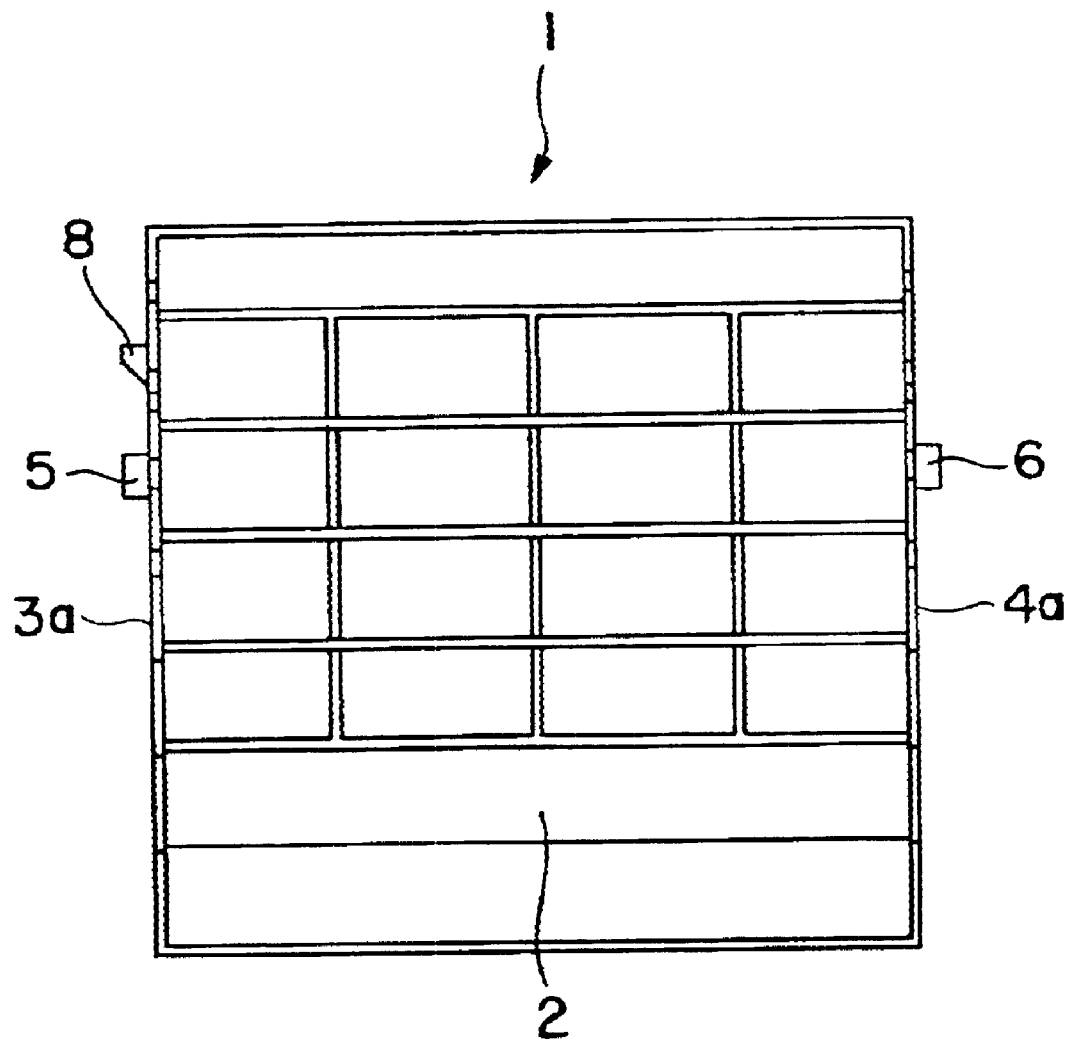
FIG. 5 is a plan view showing the cover 1.
Figure 6:
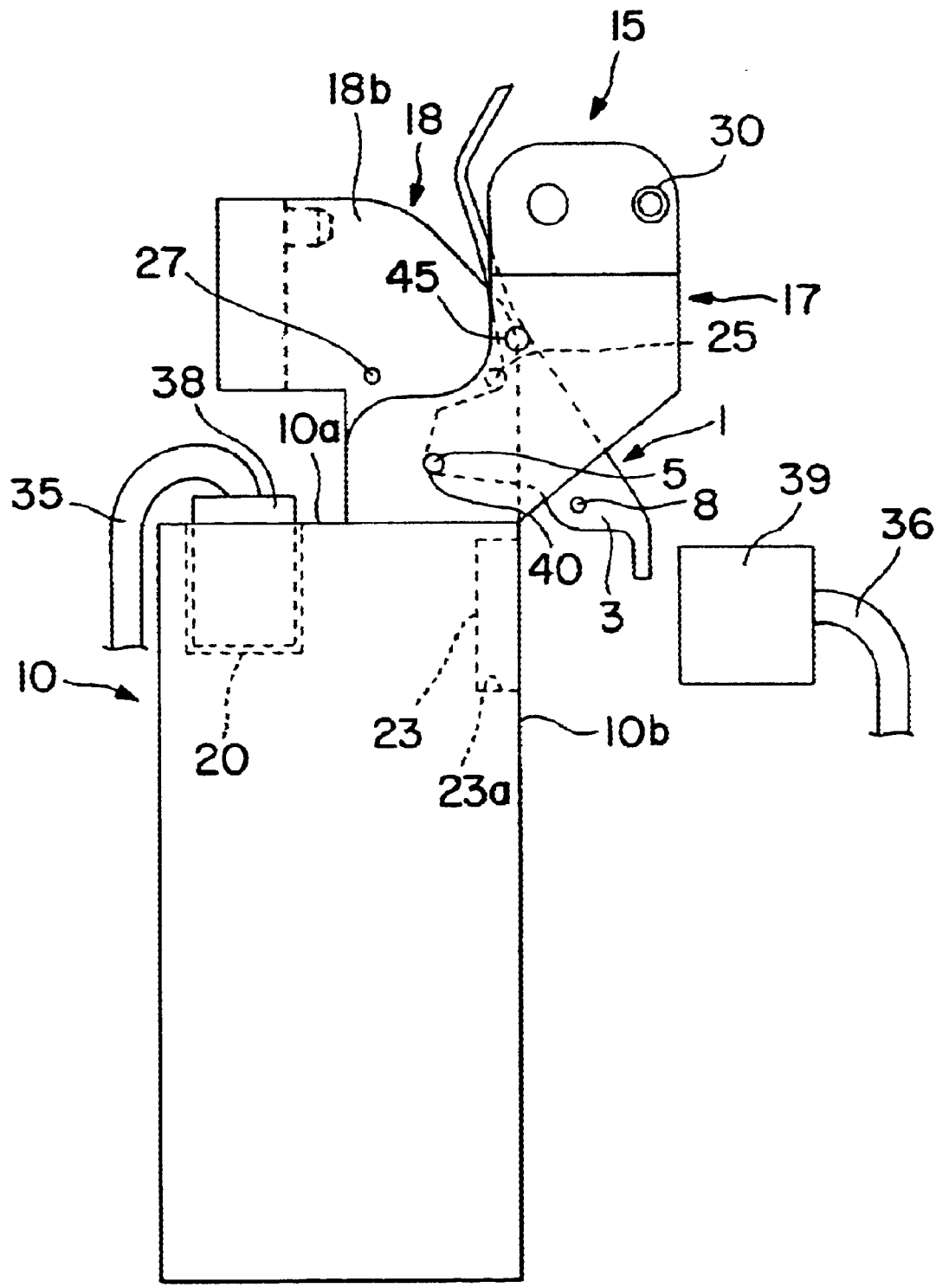
FIG. 6 is a side view showing a state before the cover 1 rotatably held on the bracket 15 covers the upper surface 10a of the junction block 10.
Figure 7:
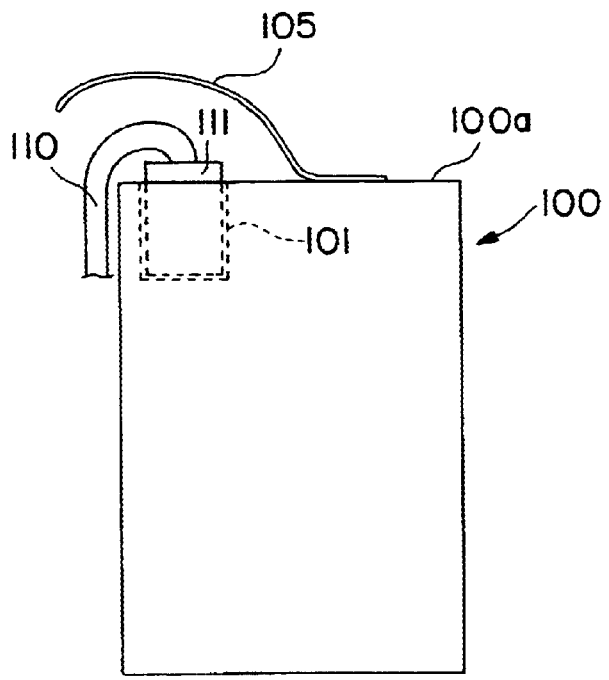
FIG. 7 is a side view showing a prior art construction for preventing water from entering a junction block 100.
Figure 8:
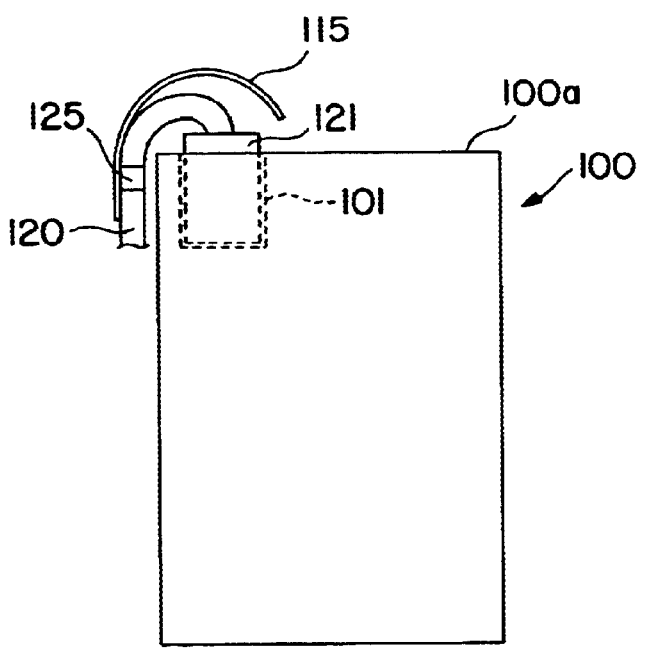
FIG. 8 is a side view showing another prior art construction for preventing water from entering the junction block 100.

The junction block 10 also has a cover 1, as shown in greater detail in FIGS. 4 to 6. The cover 1 also has a lid 2 that is substantially rectangular when viewed from above. However, the lid 2 is bent at a position closer to one side when viewed sideways. A left wall 3 projects vertically down from the left end of the lid 2 in FIG. 4, and a right wall 4 projects vertically down from the right end of the lid 2. Thus, the cover 1 is substantially U-shaped when viewed from the front (see FIG. 2). The left and right walls 3, 4 have a substantially T-shape which is narrowed toward the bottom when viewed sideways, and have substantially the same shape. A substantially cylindrical rotatable shaft 5 projects substantially normally from the bottom end of an outer surface 3a of the left wall 3, whereas a substantially cylindrical rotatable shaft 6 projects substantially normally from the bottom end of an outer surface 4a of the right wall 4. The cover 1 is made rotatable by fitting the shafts 5, 6 into the through holes 40, 41 formed in the mounts 17, 18 respectively, as shown in FIG. 2. A projection 8 (see FIG. 4) on the left wall 3 of the cover 1 is engaged with the through hole 45 while the cover 1 is covering the upper surface 10a of the junction block 10

Concave contact corners 11 and 12 are formed in the left wall 3 and corresponding concave contact corners 13 and 14 are formed in the right wall 4, as shown in FIG. 4.

The rotation of the cover 1 is stopped by the contact of the corners 11 or 12 with the projection 25 on the inner surface 17b of the mounting plate 17 of the bracket 15 and by the contact of the contact corners 13 or 14 with the projection 26 on the inner surface 18b of the mounting plate 18 of the bracket 15. A substantially semicylindrical projection 8 is provided on the left wall 3. This projection 8 engages the through hole 45 in the mounting plate 17 of the bracket 15 while the cover 1 is covering the upper surface 10a of the junction block 10.

Rotation of the cover 1 is stopped before the cover 1 covers the upper surface 10a of the junction block 10, i.e. in a state where the cover 1 is standing, by contact of the contact corner 11 with the projection 25 on the bracket 15 and by the contact of the contact corner 13 with the projection 26 on the bracket 15. Similarly, rotation of the cover 1 is stopped in a state where the cover 1 covers the upper surface 10a of the junction block 10 by contact of the contact corner 12 with the projection 25 on the bracket 15 and by the contact of the contact corner 14 with the projection 26 on the bracket 15.

As shown in FIGS. 2 and 6, the upwardly open connector holders 20 to 22 are substantially side by side in the upper surface 10a of the junction block 10, and the laterally open connector holders 23, 24 are substantially side by side in an upper part of the side surface 10b. The connector 38 provided at an end of a wiring harness 35 and the connector 39 provided at an end of a wiring harness 36 are fitted into the connector holders 20, 23, respectively. In this embodiment, operations of fitting the connectors into the connector holders 20 and 23 for connection are described in detail, whereas operations of fitting connectors into the other holders are described only briefly.

As shown in FIG. 6, the cover 1 is standing and does not cover the upper surface 10a of the junction block 10 before the connector connecting operation. The connector 38 at the end of the wiring harness 35 then is fitted into the connector holder 20 in the upper surface 10a of the junction block 10 for connection. Connectors (not shown) similarly are fitted into the connector holders 21, 22. At this time, the cover 1 is held stationary by the contact of the contact corner 11 on the left wall 3 of the cover 1 with the projection 25 on the mounting plate 17 of the bracket 15 and, although not shown, by the contact of the contact corner 13 on the right wall 4 with the projection 26 on the mounting plate 18 of the bracket 15.

In this state, the connector holder 23 in the side surface 10b of the junction block 10 has an opening 23a thereof partly covered by the cover 1, and the connector 39 at the end of the wiring harness 36 cannot be fit into the connector holder 23. More particularly, the connector 39 cannot be inserted into the connector holder 23 unless the cover 1 is rotated counterclockwise about the rotatable shafts 5 and 6 (see FIG. 2) to expose the opening 23a of the connector holder 23 after the connector 38 is fitted into the connector holder 20. This also applies to the connector holder 24.

The cover 1 then is rotated counterclockwise to substantially cover the upper surface 10a of the junction block 10 as shown in FIG. 1, the rotation of the cover 1 is stopped by contact of the contact corner 12 on the left wall 3 of the cover 1 with the projection 25 on the mounting plate 17 of the bracket 15 and, although not shown, by contact of the contact corner 14 on the right wall 4 with the projection 26 on the mounting plate 18 of the bracket 15. Consequently, the opening 23a of the connector holder 23 is exposed.

The projection 8 on the left wall 3 of the cover 1 engages the through hole 45 in the mounting plate 17 of the bracket 15 and, simultaneously, a portion of the right wall 4 of the cover is held tightly between the two projections 26, 27 provided on the mounting plate 18 of the bracket 15. Thus, the cover 1 has its rotation securely stopped while covering the upper surface 10a of the junction block 10. In this state, the connector 39 at the end of the wiring harness 36 can be fit into the connector holder 23 for connection. A connector (not shown) similarly can be fit into the connector holder 24 for connection.

As described above, the connector 38 at the end of the wiring harness 35 is fit into the connector holder 20 in the upper surface 10a of the junction block 10 and the unillustrated connectors are fit into the connector holders 21, 22. The cover 1 then is rotated counterclockwise, and the connector 39 at the end of the wiring harness 36 is fit into the connector holder 23 in the side surface 10b and the unillustrated connector is fitted into the connector holder 24. In this way, the connectors can be fitted into the connector holders in the junction block 10.

As described above, the cover 1 can substantially cover the entire upper surface 10a of the junction block 10. Thus, water drops e.g. formed on the outer surface 50a of the duct 50 cannot enter into the connector holders 20 to 22 in the upper surface 10a. Further, unless the cover 1 is rotated to cover the upper surface 10a of the junction block 10, the connector holders in the side surface 10b of the junction block 10 are not exposed and, therefore, the connector 39 cannot be connected at the side surface 10b.

Accordingly, a step of rotating the cover 1 to cover the upper surface 10a of the junction block 10 during the connector connecting operation cannot be forgotten. Further, the rotation of the cover 1 is stopped by contact with projections on the bracket 15. Thus, the connector connecting operation can be performed easily, thereby improving operation efficiency.

It should be appreciated that various changes can be made in the present invention. For example, although the cover is rotatably mounted on the bracket in the foregoing embodiment, it may be directly mounted on the junction block. Further, a lock may be provided on the cover itself and engaged with a projection on the mounting plate of the bracket to stop the rotation of the cover. The lid 2 of the cover 1 is not limited to a shape that is substantially rectangular when viewed from above and is bent at the position closer to one end when viewed sideways. The lid 2 may take any shape provided that it can prevent the water entrance from the duct or other source by covering the upper surface of the junction block.

As described above, the cover is rotatably held on the bracket used to mount the junction block on the vehicle body, and the second connector cannot be fit into the connector holder in the side surface of the junction block for connection unless the cover is rotated after the first connector is fitted into the connector holder in the upper surface of the junction block for connection.

Moreover, the cover preferably has its rotation stopped by the locking mechanism on the bracket and, thus, is not free to rotate during the connector connecting operation. Therefore, the water entrance can be prevented and operation efficiency can be improved.

What is claimed is:

1. A cover (1) for a junction block (10), the junction block (10) having upper and side surfaces (10a, 10b), at least one upper connector holder (20–22) in the upper surface (10a) and at least one side connector holder (23, 24) in the side surface (10b), the cover (1) comprising means for mounting the cover (1) on the junction block (10) for rotation between first and second positions, the cover (1) being configured for at least partly blocking the side connector holder (23, 24) when the cover (1) is in the first position so that a side connector (39) cannot be fit into the side connector holder (23, 24), the cover further being configured to permit the side connector (39) to be fit in the side connector holder (23, 24) and to substantially cover the upper connector holder (20–22) and an upper connector (38) therein when the cover (1) is rotated to the second position for preventing water from entering the junction block (10).

2. The cover of claim 1, wherein the cover (1) is mounted rotatably on a bracket (15) used to mount the junction block (10) on a vehicle body.

3. The cover of claim 2, wherein the bracket (15) comprises a locking mechanism (26, 27) for limiting rotation of the cover (1).

4. The cover of claim 1, wherein the cover (1) is rotatably mountable between two mounting portions (17, 18) projecting from the junction block (10).

5. The cover of claim 1, comprising a lid (2) for substantially covering the upper surface (10a) of the junction block (10) when the cover (1) is in the second position, two walls (3, 4) projecting angularly from the lid (2), wherein at least one of the walls (3; 4) and the lid (2) at least partly covers the side connector holder (23, 24) when the cover (1) is in the first position.

6. A junction block (10) comprising upper and side surfaces (10a, 10b), at least one upper connector holder (20–22) in the upper surface (10a) and at least one side connector holder (23, 24) in the side surface (10b), a cover (1) being mountable on the junction block (10) for rotation between a first position where the cover (1) at least partly blocks the side connector holder (23, 24) so that a side connector (39) cannot be fit into the side connector holder (23, 24) and a second position where the side connector (39) can be fit in the side connector holder (23, 24), the cover (1) being configured to substantially cover the upper connector holder (20–22) and an upper connector (38) therein when the cover (1) is rotated to the second position for preventing water from entering the junction block (10).

7. The junction block of claim 6, wherein the junction block (10) comprises a bracket (15) for mounting the junction block (10) on a vehicle body, the cover (1) being rotatably mounted on the bracket (15).

8. The junction block of claim 7, wherein the bracket (15) comprises a locking mechanism (25, 26, 27) for stopping the rotation of the cover (1).

9. The junction block of claim 6, wherein the junction block (10) comprises two mounting portions (17, 18) projecting therefrom, the cover (1) being rotatably mounted between the two mounting portions (17, 18).

10. The junction block of claim 9, wherein the mounting portions (17, 18) are plates extending integrally from the junction block (10).

11. A method for preventing water from entering a junction block (10) of an automotive vehicle, the junction block

(10) having upper and side surface (10a, 10b) formed respectively with upper and side connector holders (20–24), the method comprising:

rotatably mounting a cover (1) on the junction block (10) in a first position rotatably spaced from the upper connector holder (20–22) and at least partly side connector holder (23, 24);

fitting a first connector (38) into the upper connector holder (20–22) of the junction block (10) for connection;

rotating the cover (1) to second position substantially covering the upper connector holder (20–22) and the first connector (38) therein and spaced from the side connector holder (23, 24); and fitting a second connector (39) into the side connector holder (23, 24) in face (10b) of the junction block (10) for connection.

12. The method of claim 11, wherein the step of mounting the cover (1) comprises mounting the cover (1) on a bracket (15) that mounts the junction on the vehicle.

13. The method of claim 12, wherein the step of rotating the cover (1) comprises stopping the cover (1) by a locking mechanism (26, 27) provided on the bracket (15).

14. The method of claim 11, wherein the step of mounting the cover (1) comprises rotatably mounting the cover (1) between two mounting plates (18) projecting from the junction block (10).

* * * * *